US006590206B1

(12) United States Patent
Evrard

(10) Patent No.: US 6,590,206 B1
(45) Date of Patent: Jul. 8, 2003

(54) SYSTEM FOR IONIZATION AND SELECTIVE DETECTION IN MASS SPECTROMETERS

(75) Inventor: Robert Evrard, Nesles la Vallee (FR)

(73) Assignee: Christian Fiot, Houston, TX (US)

( * ) Notice: Subject to any disclaimer, the term of this patent is extended or adjusted under 35 U.S.C. 154(b) by 0 days.

(21) Appl. No.: 09/518,507

(22) Filed: Mar. 3, 2000

(30) Foreign Application Priority Data

Mar. 3, 1999 (FR) .......................................... 99 02616

(51) Int. Cl.[7] .............................................. B01D 59/44

(52) U.S. Cl. ...................... 250/293; 250/290; 250/281; 250/282

(58) Field of Search ............................... 250/281, 286, 250/290, 291, 292, 297

(56) References Cited

U.S. PATENT DOCUMENTS

| | | | | | |
|---|---|---|---|---|---|
| 3,742,212 | A | * | 6/1973 | McIver, Jr. | 250/41.9 |
| 3,937,955 | A | * | 2/1976 | Comisarow et al. | 250/283 |
| 3,949,221 | A | * | 4/1976 | Liebl | 250/281 |
| 3,955,084 | A | * | 5/1976 | Giffin | 250/281 |
| 4,066,893 | A | * | 1/1978 | Dawson | 250/282 |
| 4,081,677 | A | * | 3/1978 | Dawson | 250/290 |
| 4,535,235 | A | * | 8/1985 | McIver, Jr. | 250/282 |
| 4,644,161 | A | | 2/1987 | Evrard | |
| 4,649,279 | A | | 3/1987 | Delmore | 250/427 |
| 4,931,640 | A | * | 6/1990 | Marshall et al. | 250/291 |
| 4,945,234 | A | * | 7/1990 | Goodman et al. | 250/291 |
| 4,973,840 | A | * | 11/1990 | Srivastava | 250/281 |
| 5,155,357 | A | * | 10/1992 | Hemond | 250/291 |
| 5,304,799 | A | * | 4/1994 | Kurzweg | 250/296 |
| 5,313,061 | A | | 5/1994 | Drew et al. | 250/281 |
| 5,463,220 | A | | 10/1995 | Young et al. | |
| 5,525,799 | A | | 6/1996 | Andresen et al. | 250/288 |
| 5,539,204 | A | | 7/1996 | Coutts et al. | 250/289 |
| 5,614,711 | A | | 3/1997 | Li et al. | |
| 5,661,298 | A | | 8/1997 | Bateman | |
| 6,013,913 | A | | 1/2000 | Hanson | |
| 6,020,586 | A | | 2/2000 | Dresch et al. | |

* cited by examiner

*Primary Examiner*—John R. Lee
*Assistant Examiner*—David A. Vanore
(74) *Attorney, Agent, or Firm*—Rosenthal & Osha L.L.P.

(57) ABSTRACT

A mass spectrometer is disclosed which includes an ionizer, a collector slit disposed at a predetermined distance from the ionizer, and an electrostatic field source disposed between the ionizer and the collector slit. The electrostatic field source has a selected amplitude which is substantially uniform within a space between the ionizer and the collector slit. The electrostatic field is oriented substantially perpendicular to a line between the ionizer and the collector slit. The mass spectrometer includes a magnetic field source disposed between the ionizer and the collector slit. The magnetic field source induces a substantially uniform magnetic field within the space. The magnetic field has a direction perpendicular to both the electrostatic field and to the line between the ionizer and the collector slit. The spectrometer includes a detector disposed behind the collector slit. The selected electrostatic field amplitude is chosen so that ions having a particular mass number traverse a substantially cycloidal path between the ionizer and the collector slit. The cycloidal path has a linear component which is substantially equal to the selected distance at a position substantially along the line.

18 Claims, 4 Drawing Sheets

SYSTEM FOR IONIZATION AND SELECTIVE DETECTION IN MASS SPECTROMETERS

FIELD OF THE INVENTION

The invention relates to mass spectrometry. More particularly, the invention relates to a mass spectrometer having increased ionizing efficiency, sensitivity and resolution.

BACKGROUND

Mass spectrometers are important analytical tools for determining structural information about molecules. Three of the most common types of mass spectrometers are quadrapole mass spectrometers, sector-field mass spectrometers, and time of flight mass spectrometers.

Time-of-flight (TOF) mass spectrometers operate on the principle that ions having different mass-to-charge ratios (m/z), when projected into a region free of an electric field, will separate according to these ratios. Lighter particles have a shorter TOF over a particular flight distance. If ions travel a fixed distance, d, from an ion source to an ion detector, the total TOF can be determined by the expression:

$$t=d(m/2zeV)^{1/2} \quad (1)$$

where z is the ion charge, e is the electric charge, and V is the accelerating voltage across the path from the ion source to the ion detector. In the case of constant ion energy (the usual assumption), the flight time t, is proportional to the square root of the ionic mass. Consistently with the previous statement, the light ions reach the detector before the heavy ones. Thus, by measuring the flight time, t, from the ion source to the ion detector, the ionic mass can be determined.

TOF mass spectrometers became commercially available in the early 1950's as a result of the work done by Wiley and McClaren as described in, *Review of Scientific Instruments*, Vol. 26, 1150 (1955). This reference describes a TOF mass spectrometer with an electron impact ion source using "space focusing" and "time-lag" techniques. After becoming commercially available, TOF mass spectrometers were used for a wide range of applications because of their fast scan capability. The scan capability refers to the amount of time the instrument takes to collect information on all of the different ions present within a selected mass range. However, early versions of these instruments had low sensitivity and low resolution as compared to the other types of mass spectrometers. Recently, much work has been performed to increase both the resolution and sensitivity of TOF mass spectrometers, generally by incorporating laser ionization. For example, U.S. Pat. No. 5,614,711 issued to Li et al describes a TOF mass spectrometer including an ion beam modulator to create ion "packets" which travel along a flight tube to a detector. The beam modulator, an ion source and the detector are disposed on a common axis in one embodiment. U.S. Pat. No. 6,020,586 issued to Dresch et al describes a TOF mass spectrometer having an ion pulsing region, and a controllable, multipole ion guide. The ion guide is adapted to selectively trap and release ions for detection. U.S. Pat. No. 6,013,913 issued to Hanson discloses a TOF mass spectrometer having two variable reflectrons collinearly arranged between an ion source and ion detector.

The improvements to TOF mass spectrometers described in the foregoing references are substantial, however, there is still a need for a simple, portable mass spectrometer having high sensitivity and low scan time, particularly for analysis of lighter molecules such as gases which occur in very low concentrations.

SUMMARY OF THE INVENTION

The invention is a mass spectrometer which includes an ionizer, a collector slit disposed at a predetermined distance from the ionizer, and an electrostatic field source disposed between the ionizer and the collector slit. The electrostatic field has a selected amplitude which is substantially uniform within a space between the ionizer and the collector slit. The electrostatic field is oriented substantially perpendicular to a line between the ionizer and the collector slit. The mass spectrometer includes a magnetic field source arranged to induce a static magnetic field between the ionizer and the collector slit. The magnetic field source induces a substantially uniform magnetic field within the space. The magnetic field has a direction perpendicular to both the electrostatic field and to the line between the ionizer and the collector slit. The spectrometer includes a detector disposed behind the collector slit. The selected electrostatic field amplitude is chosen so that ions having a particular mass number traverse a substantially cycloidal path between the ionizer and the collector slit. The cycloidal path has a linear component which is substantially equal to the selected distance at a position substantially along the line.

One example embodiment of the invention includes a mass spectrometer which has two first parallel electrodes having a selected first electrode potential impressed on them. The spectrometer includes second parallel electrodes disposed between and substantially perpendicular to the first parallel electrodes. The second electrodes each have impressed on them a potential which is selected to induce a substantially uniform electrostatic field oriented perpendicularly to the second electrodes and parallel to the first electrodes. The second electrodes and the first electrodes are disposed in a substantially uniform static magnetic field having a known amplitude, and oriented substantially perpendicular to the electrostatic field and perpendicular to the first electrodes. A first aperture is disposed in one of the first parallel electrodes substantially at one end thereof and at a level of a lowermost one of the second electrodes. The first aperture has a dimension approximately equal to a spacing between successive ones of the second electrodes. The spectrometer includes an electron emitter disposed substantially over the aperture external to the one of the first electrodes. In one embodiment, the emitter is a heated filament. The spectrometer includes a collector slit disposed on the lowermost one of the second parallel electrodes at a selected distance from the aperture. The spectrometer includes a detector grid located substantially behind the collector slit. The grid has a grid potential impressed thereon. In one embodiment, the grid has an internal amplifier such as a microchannel plate located behind the it. The spectrometer includes a selectable voltage source connected to the second electrodes so that a magnitude of the electrostatic field can be selected. Selecting the magnitude of the electrostatic field results in ions having a predetermined mass number traversing a substantially cycloidal path having a component along the lowermost electrode substantially equal to the selected distance. Such ions can pass freely through the collector slit and be detected by the detector grid. Other mass number ions do not pass through the collector slit.

In one embodiment, the spectrometer includes a periodic potential applied to the first electrodes and to the grid. Ions having selected a mass number are collected by the grid when the grid periodic potential is in phase with the first electrode potential. In this embodiment, ions having mass numbers equal to the selected mass number plus an integer are collected at the grid when the grid potential is delayed from the first electrode potential by a selected time delay.

DETAILED DESCRIPTION

Figure 1A:
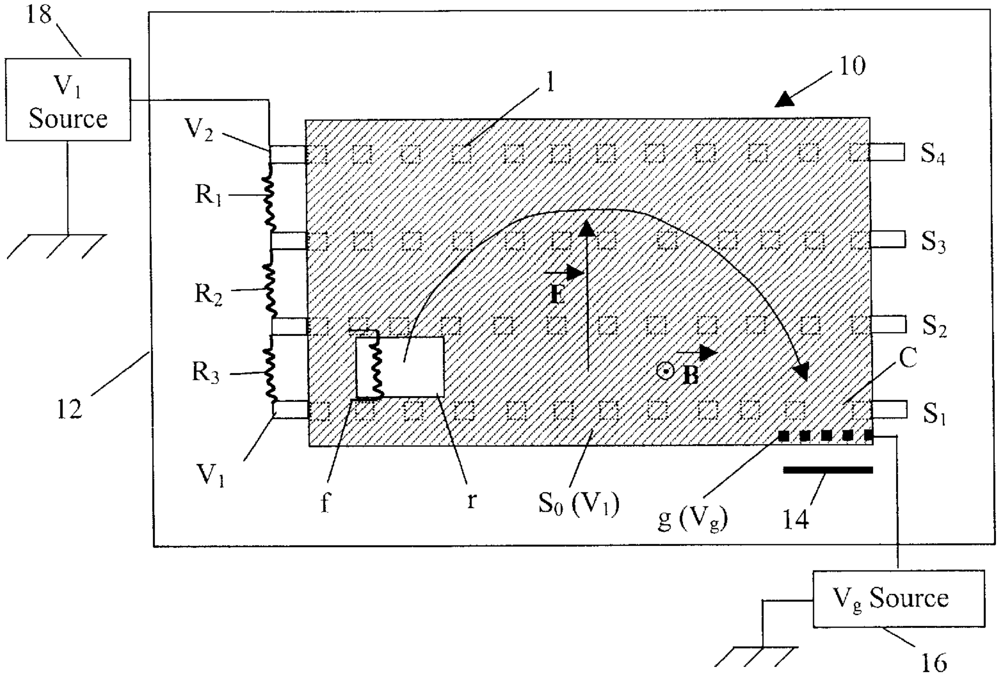
FIG. 1*a* shows a side view of one embodiment of the invention.
Figure 1B:
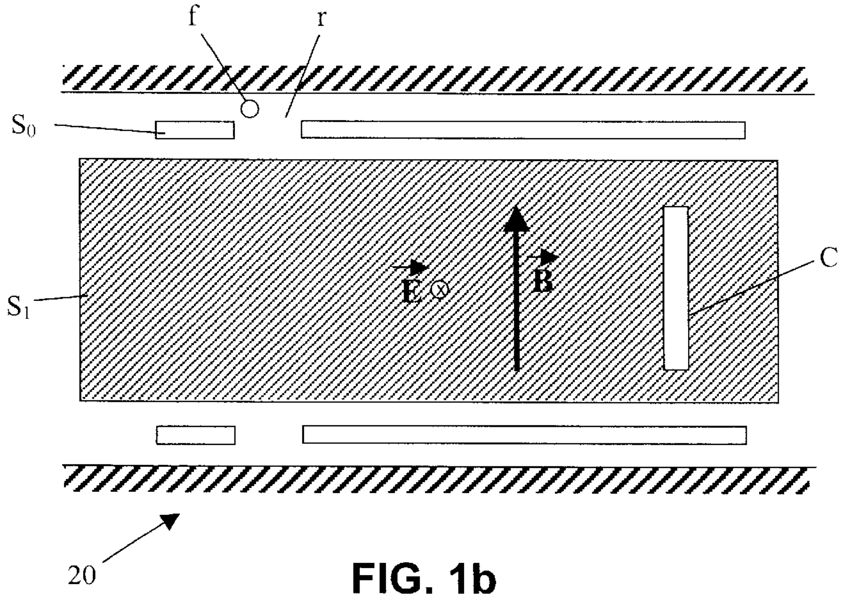
FIG. 1*b* shows a bottom view of the embodiment shown in FIG. 1*a*, i.e., rotated 90 degrees.

FIG. 1*a* shows one example of an arrangement of components for a mass spectrometer according to the invention. In FIG. 1*a*, a mass spectrometer electrode array 10 is disposed inside a vacuum tube or chamber 12. The vacuum chamber 12 cain be evacuated using any technique known in the art for evacuation of mass spectrometer vacuum (ion flight) chambers. The chamber 12 is preferably made from a non-magnetic material, and even more preferably from an electrically conductive non-magnetic material. The electrode array 10 includes two first electrodes $s_0$, which in this embodiment are substantially planar, parallel, electrically conductive plates. The view shown in FIG. 1*a* is to one side of one of the first parallel electrodes $s_0$ so that only one of the two first parallel electrodes $s_0$ is visible. Second parallel electrodes, $s_1$, $s_2$, $s_3$ and $s_4$ are disposed between the first parallel electrodes $s_0$ in the array 10, and are substantially perpendicular to the first parallel electrodes $s_0$. Although this example shows four second parallel electrodes, the exact number of the second parallel electrodes is not a limitation on the invention. The second parallel electrodes, $s_1$, $s_2$, $s_3$ and $s_4$ are substantially parallel to each other and are electrically conductive. Some of the second parallel electrodes, $s_2$, $s_3$ and $s_4$, have small slits l extending across the width of the second electrodes, the slits being placed at selected positions along the length of the second electrodes, so that ions may pass freely between them. The dimensions and significance of the slits l will be further explained. The lowermost (in FIG. 1*a*) second electrode $s_1$, shown in more detail in FIG. 1*b*, is substantially in the form of a flat plate and has a collector slit c located at a selected distance from an ion source (or ionizer) aperture r. The aperture r is disposed near one end of one of the first parallel electrodes $s_0$ as shown in FIG. 1*a*. The purposes of the slit c and the aperture r will be further explained.

Again referring to FIG. 1*a*, the purpose of the second parallel electrodes $s_2$, $s_3$ and $s_4$ in this embodiment is to induce, in the space between the first electrodes $s_0$, a substantially uniform electrostatic field (shown by E) within the array 10. The electrostatic field E is oriented in a direction substantially perpendicular to the second: parallel electrodes $s_1$, $s_2$, $s_3$ and $s_4$, and along the direction of the planes of first electrodes $s_0$. In the example shown in FIG. 1*a*, the electrostatic field E is created by connecting a voltage, source 18, which preferably has a selectable voltage output, designated $V_2$, to electrode $s_4$. In this example embodiment, the other ones of the second parallel electrodes; $s_1$, $s_2$, and $s_3$, are interconnected to $s_1$ and $s_4$ by a series of resistors R1, R2, R3 so that the voltages impressed on each of the second parallel electrodes $s_1$, $s_2$, $s_3$ and $s_4$ are such that the electrostatic field E is substantially uniform within the array 10 and oriented in the direction shown in FIG. 1*a*. Uniform, for purposes of this description, means that the amplitude and direction of the field are substantially constant at any position within the space defined externally by the first and second electrodes. Other means to produce the desired properties of the electrostatic field E are possible, for example, a series of discrete voltage sources (not shown) could be individually coupled to each one of the second parallel electrodes $s_1$, $s_2$, $s_3$ and $s_4$ so as to produce the same resulting electrostatic field E.

As will be further explained, the impressed voltage $V_2$ (and, if discrete voltage sources instead of resistors are used, the corresponding voltages applied to the other second electrodes) in this embodiment are preferably selectable to be able to produce a selectable amplitude for the electrostatic field E induced by the second parallel electrodes $s_1$, $s_2$, $s_3$ and $s_4$. It should be understood that the source 18 need not be selectable if only one value of electrostatic field E amplitude is to be impressed within the array 10. As will be further explained, this may limit the mass numbers of ions which can be detected by the system, but it does not affect the underlying principle by which the mass spectrometer of the invention operates.

At least one of, and preferably both, the first parallel electrodes $s_0$ each include, as previously described, an aperture r substantially to one side of thereof and located substantially between the positions of second parallel electrodes $s_1$ and $s_2$. The purpose of the apertures r will be further explained. The volume defined between the apertures and second electrodes in this embodiment is on the order of 1 $cm^3$. Other ionization volumes may be used, but the selected volume, as will be explained, may represent a suitable compromise between resolution and sensitivity of the mass spectrometer according to the invention.

A bottom view (rotated 90 degrees) of the array 10 shown in FIG. 1*a* is shown in FIG. 1*b*. Lowermost second parallel electrode $s_1$ is shown disposed between the first parallel electrodes $s_0$. The first parallel electrodes $s_0$ are shown at the level of the base of the apertures r, and so each of the apertures r appears in FIG. 1*b* to have a gap therein. The lowermost second parallel electrode $s_1$ includes near one end the previously described detector slit c, the position and purpose of which will be further explained.

Referring briefly once again to FIG. 1*a*, an electron source or emitter f is shown disposed at one end of one of the apertures r. In this embodiment, the electron source is a heated filament. The heated filament f emits electrons which are used as will be further explained, to ionize samples passed through the array 10.

A magnetic field B, oriented as shown in FIG 1*a* and FIG. 1*b*, is impressed onto the array 10. The magnetic field B can be induced by any suitable magnetic source, such as a permanent magnet or electromagnet, such as shown at 20 in FIG. 1*b*. The magnetic source 20 is typically disposed outside the chamber (12 in FIG. 1*a*) and must be arranged so that the magnetic field B is perpendicular to the electrostatic field E and to the first electrodes $s_0$. The magnetic field B should have substantially uniform amplitude and direction within the array 10. The, magnitude and purpose of the magnetic field B will be further explained.

The electron emitter, filament f in this embodiment, is arranged so that it is disposed approximately over one of the two apertures r as is shown in FIG. 1*a*. The filament f is preferably oriented substantially parallel to the electrostatic field E. The filament f is preferably connected to a low-voltage power source. The average potential on the filament f should be about −70 volts with respect to the potential on the first one of the second parallel electrodes. In one simplified embodiment, one end of the filament f is grounded.

The space within the array 10, for purposes of explaining the invention, can be described by three orthogonal axes. As shown in FIG. 2*b*, an x axis is oriented perpendicularly to the magnetic field B and to the electrostatic field E, generally along the length of the first parallel electrodes $s_0$. A y axis is oriented parallel to the electrostatic field E and perpendicularly to the magnetic field B, generally across the length of the first parallel electrodes $s_0$. A y axis is parallel to the magnetic field B, perpendicular to the first parallel electrodes $s_0$ and along the space between the first parallel electrodes $s_0$.

One of the second parallel electrodes s, and the first parallel electrodes $s_0$ are polarized at potential $V_1$, which in this example is approximately 70 volts above neutral. A range for potential $V_2$ is about −1000 to +1000 volts with respect to neutral. The polarity of $V_2$ will typically be negative when the array 10 is used to accelerate and analyze positive ions, and will be positive for analysis of negative ions.

Electrons emitted by the filament f are accelerated by potential $V_1$ into the space between the first parallel electrodes and second parallel electrodes $s_1$ and $s_2$, where the electrons are subjected to the orthogonal electrostatic field E and magnetic field B. Using the x, y and z axes described previously, and locating the origin of these axes substantially in the middle of the one of the apertures r, as shown in FIG. 2*b*, the motion of the emitted electrons in the x, y plane as a function of time can be described by the following equations, where the starting point coordinates $x_0$ and $y_0$ and the initial speed components are neglected. The electron motion can be described by:

$$x=-[E/(Bw_0)]\sin w_0t+[E/(Bw_0)]w_0t \quad (2)$$

and $$y=-[E/(Bw_0)](1-\cos w_0t) \quad (3)$$

where $w_0=(e/m_0)$ and $(e/m_0)$ represents the ratio of charge-to-mass for the electrons. Equations (2) and (3) describe cycloidal paths of very small amplitude. Generally, the electrons drift in the x direction at an average speed of E/B. Along the z axis, the electrons oscillate repeatedly between the first parallel electrodes $s_0$ along paths such as shown in FIG. 2*a*.

Figure 2A:
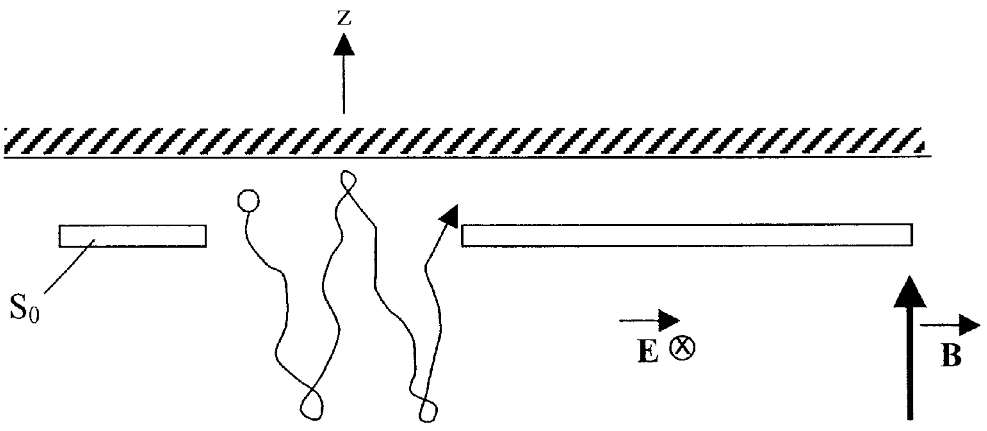
FIG. 2*a* shows the motion of electrons in the z plane of the embodiment shown in FIG. 1*a*.
Figure 2B:
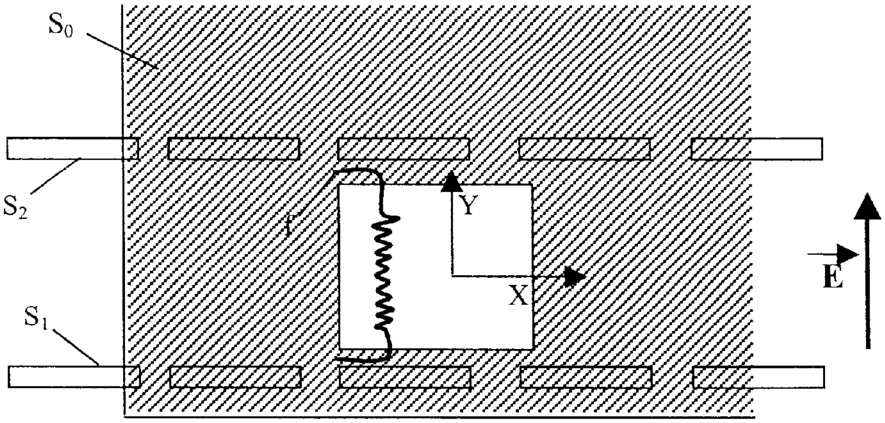
FIG. 2*b* shows the ionization area and the x and y reference axes for the embodiment shown in FIG. 1*a*.

The combination of these motions causes the electrons to very tightly occupy the space within, and substantially limited by, the apertures r and second electrodes $s_1$ and $s_2$, as is shown in FIG. 2*a* and 2*b*. This tight occupation of the space by the electrons results in extremely high ionization efficiency for any analyte sample inserted into the tube 12.

When an analyte sample is passed through the aperture r, the moving electrons ionize the molecules of the analyte. The analyte ions are then subject to the orthogonal electrostatic field E and magnetic field B. The motion of the ions within the E and B fields can be described by equations similar to those shown previously to describe electron movement. For an ion having a mass number n the x, y coordinate position of the ion at any time t can be described by:

$$x=-[nE/(Bw)]\sin (w/n)t+[E/(Bw)]wt \quad (4)$$

and $$y=-[nE/(Bw)](1-\cos (w/n)t) \quad (5)$$

where w=[(e/m)B], and (e/m) represents the ratio of charge-to-mass for the ion $H^+0$ (free proton). Similarly to electron motion equations (2) and (3), ion motion equations (4) and (5) describe cycloidal paths, but with larger amplitude than that of the electron motion. Because of the mass dependent nature of the cycloidal path as described in equations (4) and (5), all ions having the same mass number, n, follow substantially identical paths. Such cycloidal paths correspond to a time-of-flight τ for a particular ion which can be described by the equation:

$$\tau=(2\pi n/w) \quad (6)$$

From equation (6), it can be shown that, when y=0, $$x=(E/Bw)\ 2\pi n \quad (7)$$

The previously described slit (c in FIG. 1*b*) is located at a selected point, typically on the lowermost second parallel electrode ($s_1$ in FIG. 1*b*). At this selected point the x-coordinate is equal to "d". As previously explained in the description of the coordinate system for the array (10 in FIG. 1*a*), on the surface of second parallel electrode $s_1$, y is equal to 0. Ions having a mass number equal to n will have a trajectory which ends at the location of the collector slit c where the electrostatic field has a magnitude defined by the expression:

$$E_n=(Bw/2\pi n)d \quad (8)$$

The relationship shown in equation (8) shows that for a selected amplitude of magnetic field B, and the predetermined distance d between the ion source and the collector slit C, there is a value for the amplitude of the electrostatic field $E_n$ which results in ions having mass number n travelling along a cycloidal path having a component along the direction of the second electrodes equal to d (where y=0). By selecting the voltages ($V_2$ as graduated through the resistors R1, R2, R3 or similar mechanism) applied to the second parallel electrodes $s_1$–$s_4$, the amplitude of the electrostatic field E can be particularly selected so that ions having a selected, mass number n will travel along cycloidal paths having a linear component equal to the distance d. This provides for very efficient collection of ions having mass number n, as they pass through the collector slit c (which is located at distance d). Very few ions having mass number not equal to n, however, will pass through the slit c because the trajectory followed by these ions has linear component (component along a line between the ion source and collector slit c) not equal to, d when y=0. Changing the selected voltages ($V_2$ as graduated through the resistors R1, R2, R3 or functionally similar arrangement of voltage sources) will result in a corresponding change in the mass number n of the ions which will readily pass through the slit c, because the amplitude of the electrostatic field E will change accordingly. It should be noted that the relationship of equation (8) suggests that the mass number of ions which would travel along the appropriate cycloidal path from aperture r to detector slit c could be also selected by adjusting the amplitude of the magnetic field B. Such, adjustment of the magnetic field B amplitude is clearly contemplated if the magnet (20 in FIG. 1*b*) is an electromagnet.

Referring briefly once again to FIG. 1*a*, a detector grid g, having applied thereto a selected grid potential $V_g$ is included behind the receptor slit c. The grid potential $V_g$ ($V_g < V_1$) is selected generally in the range of about −3000 to +3000 volts to provide efficient ion collection. As is the case for the second parallel electrodes, the voltage applied to the grid will be negative for collection of positive ions, and will be positive for collection of negative ions. An internal amplifier 14, which could be a microchannel plate (MCP) or a microsphere plate (MSP), for example, is positioned generally behind the grid g. By using an MSP, for example, the gain is of the order of $10^6$ A. Such internal amplifiers, however, generate background noise on the order of $10^{-9}$ A, meaning that the detected signal at the grid g must be greater than $10^{-15}$ A.

The slits l in second parallel electrodes $s_2$, $s_3$, $s_4$ have a size and spacing selected to fall on an average cycloidal ion path between the aperture r and collector slit c so that such ions may pass freely through the slits. Ions not traveling on the average cycloidal path, namely those ions which are not the correct mass for the selected value of electrostatic field E will typically strike one of the second electrodes $s_2$, $s_3$, $s_4$ so that it will be much more unlikely for any of these ions to pass through the collector slit c. The width and spacing of the slits l can be adjusted to provide the mass spectrometer of the invention with a desired sensitivity and resolution. Generally, the smaller the slit sizing, the lower the sensitivity and higher the resolution, and vice versa. The size of the slits should account for the dispersion of trajectories in ions even of the same mass number due to the random values of their initial energies.

The sensitivity of a mass spectrometer constructed as shown in FIGS. 1*a*, 1*b*, 2*a* and 2*b* is generally proportional to the volume of the ionization space. The volume of the ionization space in this embodiment is related to the dimensions of the apertures r. Thus, the sensitivity of the mass spectrometer increases as the dimensions of the apertures r increase. However, the resolution of the spectrometer is limited by these dimensions.

Figure 3:
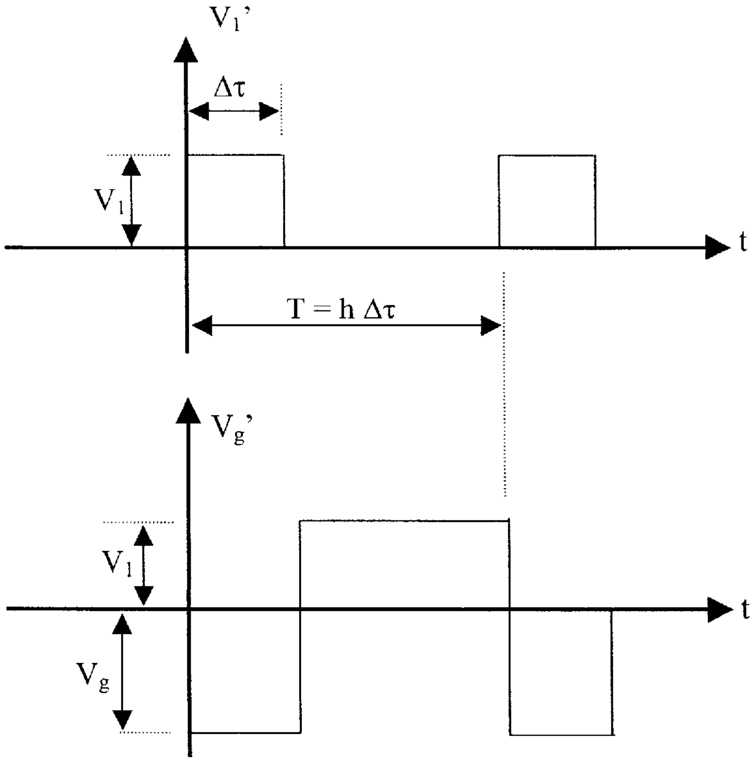
FIG. 3 shows a graph of a periodic voltage applied to the ion source and selector grid.

In order to achieve high sensitivity, while maintaining good resolution, another embodiment of the invention takes advantage of the relationship between mass of the ions and the time of flight (TOF) from the ionization area to the collection slit c. The difference in TOF, $\Delta\tau$, for ions having two consecutive mass numbers, n and n+1, is equal to $2\pi/w$ and is independent of n. This embodiment of the invention exploits this relationship to improve resolution of the mass spectrometer. The fixed potential $V_1$ is substituted in this embodiment with a periodic potential $V_1'$, having a period $T=h\Delta\tau$, and a potential interval length of $T/h = \tau\Delta$, where h is an integer. $V_1'=V_1$ during the interval Grand is substantially zero outside the interval. The time and potential for $V_1'$ is shown in the graph in. FIG. 3. Similarly, a periodic grid potential $V_g'$, having the same period and width as $V_1'$ is applied to the grid g. $V_g'=V_g$ during the interval $\Delta\tau$ and $V_g'=V_1$ outside the interval. Ions are created only within the interval $\Delta\tau$ of each period because $V_1'$ is zero outside the period and no electrons are drawn into the array (10 in FIG. 1*a*) as a result. For ions having a mass number n=kh (where k is an integer), the time-of-flight of these ions, $2\pi n/w$, is equal to $kh\Delta\tau=kT$, namely, an integral number k of periods T. These ions will be collected if $V_1'$ and $V_g'$ are in phase For ions having amass number n+1=kh+1, the time of flight of these ions will be equal to $2\pi n(n+1)/w$. These ions arrive at the collector slit c at a time when $V_g'=V_1$. These ions will therefore be repelled by the grid g and will not collected because they then have the same sign charge the electric charge on the grid g. These ions will be collected, however, if the periodic grid potential $V_g'$ is delayed with respect to the periodic electrode potential $V_1'$ by a time equal to T/h. Therefore, by selecting the time delay between the periodic electrode potential $V_1'$ and the periodic grid potential $V_g'$ by successive times T/h, 2T/h, 3T/h, etc. it is possible to collections having successive mass numbers described by a multiple of h. The resolution of such measurements is proportional to h, but the sensitivity of such measurements is divided by h. For most applications, a value of h equal to 2 or 3, will provide high enough resolution, without lowering the sensitivity to an unusable degree. An additional aspect of this embodiment of the invention occurs for values of h=2. In this case, ions having even mass numbers are collected when $V_1'$ and $V_g'$ are in phase. Ions having odd mass numbers are collected when there is a phase difference of T/2.

Figure 4:
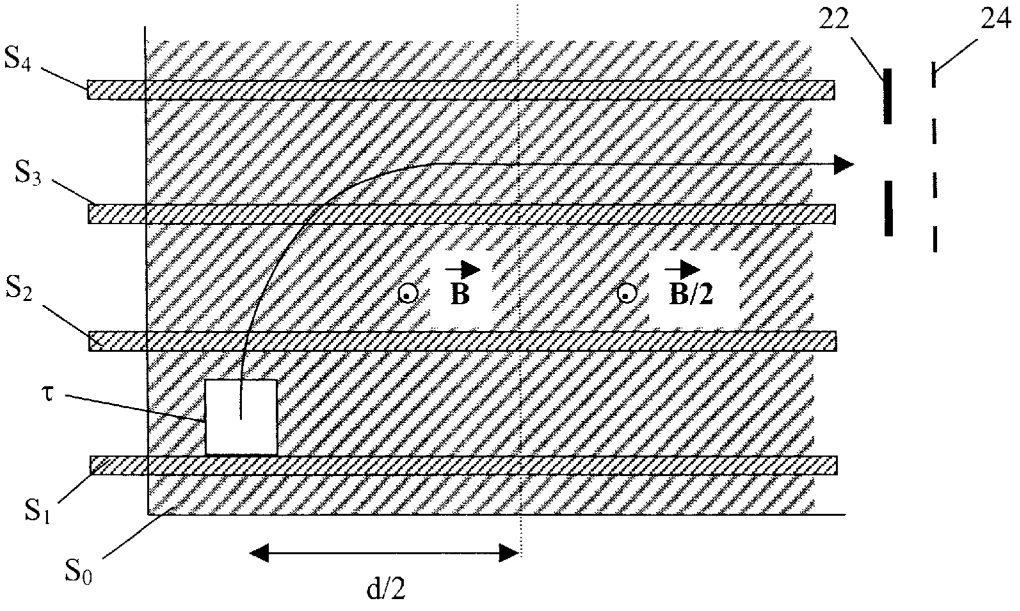
FIG. 4 shows the effect of balanced forces on the flight path of an ion, resulting in a collimated ion beam.
Figure 5A:
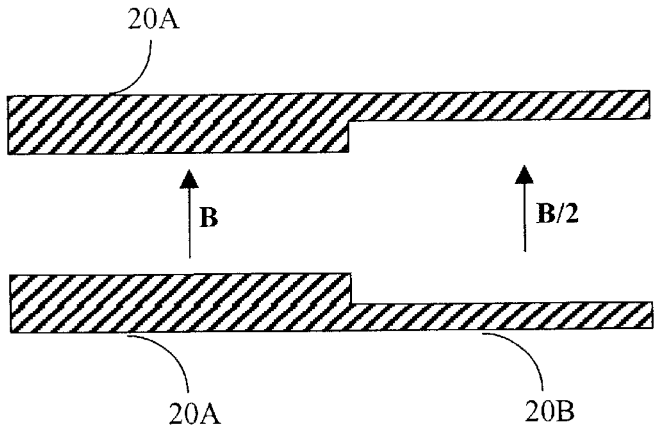
FIG. 5*a* shows a discontinuous magnetic circuit gap used to produce the flight path shown in FIG. 4.
Figure 5B:
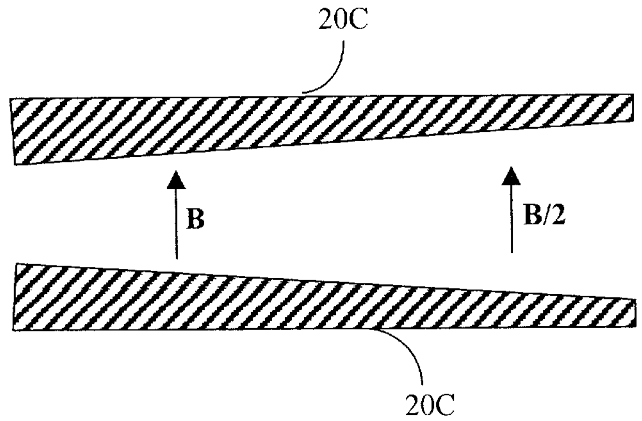
FIG. 5*b* shows a continuously variable magnetic circuit gap used to produce, the flight path shown in FIG. 4.

In another embodiment of the invention, the magnetic profile of the system can be changed by either increasing discontinuously the magnetic circuit gap as in FIG. 5*a*, where the magnet (20 in FIG. 1*b*) is divided into sub-magnets 20A, 20B each having geometry with respect to the array (10 in FIG. 1*a*) that provides a magnetic field amplitude within sub-magnets 20B equal to half the amplitude within sub-magnets 20A. More simply, the magnetic field strength B can be decreased continuously using tapered magnets 20C as shown in FIG. 5*b* between the ionization space and the collection slit c. If the magnetic field strength B is changed, so that the magnetic field strength B is reduced to B/2 at the x position corresponding cycloidal path electrostatic field E and the magnetic field B be exactly opposed so that selected ions will travel along a straight line, parallel to the second parallel electrodes $s_1$, $s_2$, $s_3$ and $s_4$, resulting in a collimated ion beam, as shown in FIG. 4. The embodiment shown in FIG. 4 includes at the end of the second electrodes opposite the aperture a second detector grid 24. The second detector grid 24 substitutes the detector grid (g in FIG. 1*a*) in the previous embodiment of the invention because in the present embodiment, ions travel in a "semi-cycloidal" path, that is, they travel in a substantially straight line past the location of half the distance, to the collector slit (d) as in the previous embodiment. This has the effect of improving the transmission of ions to its maximum, resulting in an increase in sensitivity. To improve the resolution, a collector slit or ion lens array, shown generally at 22 in FIG. 4, can be placed in the path of the ion beam before the second grid 24. The second slit or lens array can be any type known in the art for focusing an ion beam. The type of slit or array is not intended to limit the invention.

The second grid 24 is generally charged to a potential similar to that of the grid as in the previous embodiment of the, invention. As previously explained, the voltage applied will be positive or negative depending on the polarity of the ions being analyzed.

In another embodiment of the invention, the detection of ions from a sample can be amplified by modulating the fixed potential $V_1$, at low frequencies, such as about 1 kHz. In one example, the modulation can be sinusoidal. The ionization and the useful ion detection signal will be modulated at the same frequency. Because background noise is generally continuous, the ion detection signal can be selectively detected and amplified. This has the effect of dramatically raising the sensitivity of the mass spectrometer, but has substantially no effect on the resolution of the spectrometer. This method of modulating the fixed potential $V_1$ at low frequency differs from the previously described modulation method, and has the effect of increasing the sensitivity of the spectrometer.

Figure 6A:
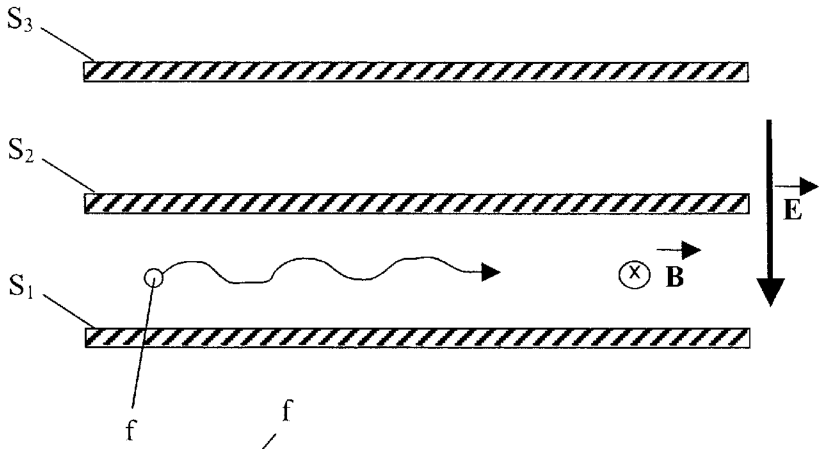
FIGS. 6*a* and 6*b* show an example of a technique to generate and detect negative ions.
Figure 6B:
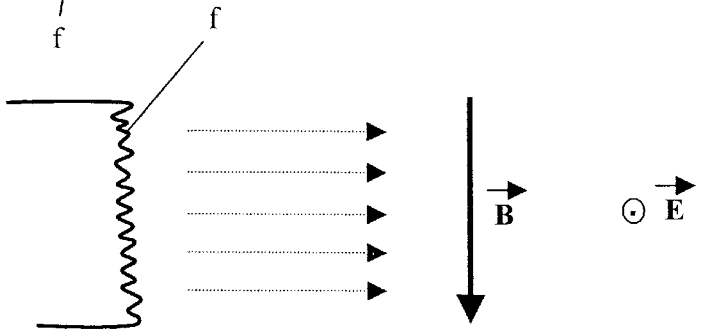

In another embodiment of the invention, the invention can be used to create and detect negative ions. By reversing the orientation of both the electrostatic field E, and the magnetic field B, as previously described, it is possible to create negative ions when the electron emitter f is located at a particular position. The orientation of the electrostatic field E can be changed by reversing the polarity of voltage $V_2$, as shown in FIG. 6*a*. The electron emitter f is preferably arranged, as shown in FIG. 6*b*, so that it is substantially parallel to the magnetic field B resulting in a swath of low energy electrons. Such as swath is a very efficient source for negative ions.

The invention uses the fact that the electrons emitted by the emitter f oscillate and scan in a volume of the order of 1 $cm^3$, therefore, their ionizing efficiency is very large. Additionally, the invention combines the effect of a crossed electric and magnetic field with time-of-flight physics, allowing, for example, one to collect the spectrum corresponding to odd and even, mass numbers separately. Finally, by judiciously choosing the profile of the magnetic circuit gap, the system can work as a selective source for collimated ion beams.

Some additional advantages of this invention are that quantitative measurements can be made of very low concentrations of very light gases, which is of vital importance, to the petroleum industry, in determining methane concentration, for example. Also, the present invention could replace the current systems in old mass spectrometers, improving sensitivity in such machines by a factor of 100 or more. An additional use of the present invention would be to connect the invention to any kind of vacuum system, for online monitoring. For example, monitoring gasses in semiconductor processing is an important concern.

The advantages of this invention arise from the high resolution and sensitivity achieved by this system, while maintaining ease of use and portability. It is possible to obtain a basic sensitivity (before amplification) on the order of 1A/Torr. This system can be used as part of a portable, highly sensitive time-of-flight analyzer, or it can be encapsulated into another type of analyzer. It should be apparent to one skilled in the art that the present invention may also be coupled with other devices to increase the amount of analytical data, for example, the present invention may be coupled with a gas chromatograph.

While the invention has been disclosed with reference to specific examples of embodiments, numerous variations and modifications are possible. Therefore, it is intended that the invention not be limited by the description in the specification, but rather the claims that follow.

What is claimed is:

1. A mass spectrometer, comprising:

an ionizer comprising first parallel planar electrodes one of which having an aperture located proximal to one corner, said first parallel planar electrodes connected to a power source that is adapted to induce first electrode alternating potentials; and an electron emitter disposed proximal to said aperture;

a collector slit disposed at a predetermined distance from said aperture;

an electrostatic field source comprising a plurality of second parallel planar electrodes arranged between said first parallel planar electrodes in a direction substantially perpendicular to said first parallel planar electrodes, said electrostatic field source adapted to induce an electrostatic field having an amplitude substantially uniform within a space between said aperture and said collector slit, said electrostatic field having a direction substantially perpendicular to said plurality of said second parallel planar electrodes;

a magnetic field source disposed outside a space defined by said first parallel planar electrodes, said magnetic field source adapted to induce a magnetic field substantially uniform within said space defined by said first parallel planar electrodes, said magnetic field having a direction substantially perpendicular to said electrostatic field and said first parallel planar electrodes; and a detector disposed behind said collector slit, said detector comprising a grid connected to a power source that is adapted to induce grid alternating potentials, wherein said first electrode alternating potentials and said grid alternating potentials are synchronized to a period having a fixed periodicity for detecting a series of ions differing by a same mass number.

2. The mass spectrometer as defined in claim 1, wherein said electrostatic field source is selectable to enable detection of ions having different mass numbers.

3. The mass spectrometer of claim 1, further comprising, a second aperture on a second one of said first parallel planar electrodes disposed in a location corresponding to a location of said first aperture.

4. The mass spectrometer as in claim 1, wherein said electron emitter comprises a heated filament.

5. The mass spectrometer as in claim 1, wherein said electron emitter is located substantially above said first aperture.

6. The mass spectrometer as in claim 1, wherein the first electrode alternating potentials comprising a first potential during a first half of the period and a zero potential during a second half of the period, the grid alternating potentials comprising a second potential during the first half of the period and the first potential during the second half of the period, the first potential being greater than zero and the second potential.

7. The mass spectrometer as in claim 6, wherein the second potential at said grid and the first potential at said first parallel planar electrodes are substantially in phase for detecting ions having an even mass number.

8. The mass spectrometer as in claim 6, wherein the second potential at said grid and the first potential at said first parallel planar electrodes are substantially out of phase for detecting ions having an odd mass number, the second potential being less than zero.

9. The mass spectrometer as in claim 1, wherein said magnetic field source is arranged so that a magnitude of said magnetic field is reduced by a factor of 2 substantially halfway between said aperture and said collection slit, whereby ions produced in said mass spectrometer comprise a collimated ion beam, and wherein said detector is disposed along a semi-cycloidal path to detect ions in said collimated ion beam.

10. The mass spectrometer of claim 6, wherein said first potential comprises a modulated potential.

11. The mass spectrometer as in claim 1, wherein said electron emitter comprises a filament stretched between two of said second parallel planar electrodes in a direction substantially parallel to said magnetic field, and the directions of the electrostatic field and magnetic field are inverted so that the mass spectrometer is adapted to detect negative ions.

12. The mass spectrometer as in claim 1, wherein the first electrode alternating potentials comprising a first potential during a first 1/n fraction of the period and a zero potential during a remainder of the period, the grid alternating potentials comprising a second potential during the first 1/n fraction of the period and the first potential during the remainder of the period, the first potential being greater than zero and the second potential, n being an integer.

13. The mass spectrometer as in claim 12, wherein the second potential at said grid and the first potential at said first parallel planar electrodes are substantially in phase for detecting ions having a mass number divisible by n.

14. The mass spectrometer as in claim 13, wherein the second potential at said grid and the first potential at said first parallel planar electrodes are substantially out of phase for detecting ions having a mass number not divisible by n, the second potential being less than zero.

15. The mass spectrometer of claim 12, wherein said first potential comprises a modulated potential.

16. The mass spectrometer of claim 15, wherein the modulated potential comprises a sinusoidally modulated potential.

17. The mass spectrometer as in claim 1, wherein said magnetic field source comprises tapered magnets so that magnitudes of said magnetic field are progressively reduced in a direction from the aperture to the collector slit, whereby ions produced in said mass spectrometer comprise a collimated ion beam, and wherein said detector is disposed along a semi-cycloidal path to detect ions in said collimated ion beam.

18. The mass spectrometer as in claim 1, wherein said magnetic field source comprises electromagnets so that a magnitude of said magnetic field is controllable.

* * * * *